United States Patent
Burke et al.

(10) Patent No.: US 11,435,258 B2
(45) Date of Patent: Sep. 6, 2022

(54) SYSTEM AND METHOD FOR LEAK DETECTION BASED ON PRV OUTLET PRESSURE MONITORING

(71) Applicant: Watts Regulator Co., North Andover, MA (US)

(72) Inventors: Joseph M. Burke, Deerfield, NH (US); Kevin Simon, Somerville, MA (US); Patrick R. Corcoran, Somerville, MA (US)

(73) Assignee: Watts Regulator Co., North Andover, MA (US)

( * ) Notice: Subject to any disclaimer, the term of this patent is extended or adjusted under 35 U.S.C. 154(b) by 42 days.

(21) Appl. No.: 17/168,403

(22) Filed: Feb. 5, 2021

(65) Prior Publication Data

US 2021/0247263 A1    Aug. 12, 2021

Related U.S. Application Data

(60) Provisional application No. 62/971,456, filed on Feb. 7, 2020.

(51) Int. Cl.
  *G01M 3/28* (2006.01)
  *F16K 37/00* (2006.01)
(52) U.S. Cl.
  CPC ....... *G01M 3/2876* (2013.01); *F16K 37/0091* (2013.01)
(58) Field of Classification Search
  CPC .............. G01M 3/2876; G01M 3/2815; F16K 37/0091
  See application file for complete search history.

(56) References Cited

U.S. PATENT DOCUMENTS

| | | | |
|---|---|---|---|
| 4,984,448 A * | 1/1991 | Jordan | G01M 3/02 73/40.5 R |
| 6,021,808 A * | 2/2000 | Dulac | F24H 9/2035 137/487 |
| 7,174,771 B2 | 2/2007 | Cooper | |
| 10,352,814 B2 * | 7/2019 | Enev | E03B 7/071 |
| 2009/0222220 A1 * | 9/2009 | Wilke | F16K 37/0091 702/41 |
| 2020/0264067 A1 * | 8/2020 | Lance | G01F 1/34 |

OTHER PUBLICATIONS

Watts, "Lead Free Series LF25AUB-Z3 Water Pressure Reducing Valves" 2020, (pp. 1-2).
Watts, "Water Pressure Reducing Valves Controlling Water Pressure in Residential, Commercial, and OEM Applications", 2019, (pp. 1-12).

* cited by examiner

*Primary Examiner* — Alexander A Mercado
(74) *Attorney, Agent, or Firm* — Harris Beach PLLC (57) ABSTRACT

A leak detection system for a building includes a pressure regulating valve (PRV) having a PRV inlet and a PRV outlet. The PRV is normally operative in a best operating range mode during flow conditions, and a PRV pressure at a lockup pressure during a no flow condition. An outlet pressure sensor is fluidly coupled to the PRV outlet to measure a PRV outlet pressure. A processor is operatively coupled to the outlet pressure sensor. A pressure monitoring process runs on the processor. The pressure monitoring process detects changes in pressure at the PRV outlet when the PRV pressure falls below the lockup pressure while remaining above a setpoint pressure to give an indicia of a building leak condition. A method to give an indicia of a building leak condition is also described.

14 Claims, 7 Drawing Sheets

The flow and outlet pressure characteristics of a PRV

DIRECT ACTING
PRESSURE REGULATOR
OPERATING MAP

SYSTEM AND METHOD FOR LEAK DETECTION BASED ON PRV OUTLET PRESSURE MONITORING

CROSS-REFERENCE TO RELATED APPLICATIONS

This application claims priority to and the benefit of U.S. provisional patent application Ser. No. 62/971,456, SYSTEM AND METHOD FOR LEAK DETECTION BASED ON PRV OUTLET PRESSURE MONITORING, filed Feb. 7, 2020, which application is incorporated herein by reference in its entirety.

FIELD OF THE APPLICATION

The application relates to leak detection, particularly to leak detection at a pressure reducing valve.

BACKGROUND

Pressure regulating/reducing valves (PRV) are used to convert a relatively high pressure supply line to a relatively constant pressure outlet. One application of a PRV is to convert a relatively high pressure municipal water supply line to a relatively constant lower water outlet pressure to the plumbing of a home or building. There are two main styles of PRVs. Direct acting regulators and pilot operated regulators. Direct acting regulators use a spring to control the outlet pressure of the PRV and are typically used in lower flow rate applications. Pilot operated regulators use a direct acting regulator as a pilot valve to control the outlet pressure and are typically used in higher flow rate applications, such as a large commercial building or facility.

SUMMARY

A leak detection system for a building includes a pressure regulating valve (PRV) having a PRV inlet and a PRV outlet. The PRV is normally operative in a best operating range mode during flow conditions, and a PRV pressure at a lockup pressure during a no flow condition. An outlet pressure sensor is fluidly coupled to the PRV outlet to measure a PRV outlet pressure. A processor is operatively coupled to the outlet pressure sensor. A pressure monitoring process runs on the processor. The pressure monitoring process detects changes in pressure at the PRV outlet when the PRV pressure falls below the lockup pressure while remaining above a setpoint pressure to give an indicia of a building leak condition.

The leak detection system can further include an inlet pressure sensor fluidly coupled to the PRV inlet, and operatively coupled to the processor.

The pressure monitoring process can detect a drift of a PRV setpoint outlet pressure. The pressure monitoring process can detect a failure or onset of failure of the PRV.

The leak detection system can further include a pressure control valve controlled by the PRV as a pilot PRV. The pressure monitoring process can detect a failure or onset of the failure of the pressure control valve.

The leak detection system can further include an isolation valve fluidly coupled downstream of the PRV. The isolation valve can include a manually controlled isolation valve. The isolation valve can include an automatic controlled isolation valve operatively coupled to a processor to periodically close the isolation valve during times of water system no use or times of no occupancy of a home or building.

A method to give an indicia of a building leak condition includes providing a pressure regulating valve (PRV) having a PRV inlet and a PRV outlet, the PRV normally operative in a best operating range mode during flow conditions, and the PRV pressure at a lockup pressure during a no flow condition, an outlet pressure sensor fluidly coupled to the PRV outlet to measure a PRV outlet pressure, a processor operatively coupled to the outlet pressure sensor; and a pressure monitoring process run on the processor; and detecting changes in a pressure at the PRV outlet when the PRV pressure falls below the lockup pressure while remaining above a setpoint pressure to give an indicia of a building leak condition.

The step of providing can further include providing an inlet sensor at the PRV inlet, and the step of detecting can include detecting changes in a pressure at the PRV outlet and the PRV inlet when the PRV pressure falls below the lockup pressure while remaining above a setpoint pressure to give an indicia of a building leak condition.

The step of providing can further include providing an isolation valve fluidly coupled downstream of the PRV, and at least once before the step of detecting, further including a step of stopping a flow through the PRV to determine a current lockup pressure. The step of stopping a flow can include stopping the flow during a time of no home or building occupancy, to give an update of the lockup pressure. The step of stopping a flow can include stopping the flow during a time of no home or building occupancy, to give an update of the lockup pressure.

The step of stopping a flow can include automatically closing the isolation valve by the processor during a time of no home or building occupancy. The step of stopping said flow can also include periodically automatically closing the isolation valve by the processor during a time of no home or building occupancy.

The foregoing and other aspects, features, and advantages of the application will become more apparent from the following description and from the claims.

BRIEF DESCRIPTION OF THE DRAWINGS

The features of the application can be better understood with reference to the drawings described below, and the claims. The drawings are not necessarily to scale, emphasis instead generally being placed upon illustrating the principles described herein. In the drawings, like numerals are used to indicate like parts throughout the various views.

DETAILED DESCRIPTION

As described hereinabove, regulating valves (PRV) are used to convert a relatively high pressure supply line to a relatively constant pressure outlet. One application of a PRV is to convert a relatively high pressure municipal water supply line to a relatively constant lower water outlet pressure to the plumbing of a home or building. In higher flow rate applications, such as a large commercial building or facility, the primary pressure regulating element is more likely to be a pilot operated regulator typically larger than a direct acting regulator. The larger pressure control valve is typically pneumatically or hydraulically controlled by a pilot valve. The pilot valve is often a direct acting regulator.

One problem common to plumbed water systems is a water leak, particularly, a relatively low flow water leak. Such leaks are not only wasteful but might lead to water damage in the vicinity of the leak. One method of the prior art to find a leak includes isolating a home or building from the water source, pressurizing the home or building water system, and observing the pressure decay curve to determine if the plumbing system is leaking. While effective at identifying a leaking system, the plumbing system is shut off and unavailable during the leak test, inconveniencing the homeowner or building occupants. That is, according to most methods of the prior art, leaks can only be detected while the water system is turned off.

It was realized that by monitoring the pressure at the outlet of a PRV, or at both of the inlet and outlet, by use of a new pressure monitoring process based on the pressure measurements, leaks can be identified without need to isolate the home or building plumbed system, and without inconvenience to the users. Moreover, it was realized that a similar pressure monitoring can be used to both check and monitor the setpoint pressure in response to PRV aging. It was also realized that the pressure monitoring can be used to identify a failing PRV valve. Finally, as a PRV can be used as the control element of a much larger pressure control valve, it was realized that the above solutions for a standalone PRV installation can also work by monitoring the same outlet pressure (or, preferably both inlet and outlet pressure) of a smart PRV which is in service as the control element of a large pressure control valve.

Generally, the system and method for leak detection based on PRV outlet pressure monitoring according to the Application, detects leaks by detecting small, sustained flows. Those small, sustained flows reduce the outlet pressure of the PRV to be below the lockup pressure, but still above the setpoint pressure. Thus, a 'Smart PRV' according to the Application acts as a small-flow detector to find the leaks. Pressure below the lockup pressure, but still above the setpoint pressure is important for determining the difference between a normal flow and a leak. Normal flow regularly causes deviation from the lockup pressure, however pressures below the lockup pressure, but still above the setpoint indicate a very small flow that could be a leak.

In typical operation, such as to regulate water pressure to a home or small building, a relatively high water pressure line enters the home or building and the PRV lowers the water pressure at the PRV outlet connected to supply the home or building plumbing system to a typical home or building operating water pressure. For example, municipal water pressure lines can vary from about 60 psi to 200 psi, in some residential neighborhoods typically lower, from about 60 psi to 100 psi. The PRV is typically set to convert the higher supply side pressure to about 40 psi to 50 psi, for example, for a home water plumbing system which supplies water to the various fixtures and appliances of the home.

The new process is based on the lockup pressure of a direct acting regulator. In the home example described hereinabove, at installation, the PRV is set to, for example, 40 psi. Within some normal precision of the PRV, perhaps on the order of plus or minus a couple of psi or better, for modest changes in pressure on the supply side and various operations of fixtures and appliances in the home, the PRV will maintain its outlet pressure to about 40 psi. During such operation, the PRV valve is said to be operating within a best operating range.

The new process is based on the lockup pressure of a direct acting regulator. When there is normal high pressure on the supply side of the PRV, such as, when no person and no appliances are using water in the home, there is a no flow situation. In a no flow situation, the water pressure at the outlet side of the direct acting regulator rises, typically by about 2% to 10% over the predetermined setpoint, the desired home pressure, 40 psi continuing the above example. In the PRV lockup mode, the outlet pressure might rise to about 41 psi. Particularly in a home, or small building, there are likely to be periods of times when there are no-flow situations (no demand), such as in the overnight hours.

One exemplary smart PRV system to carry out the new process is a leak detection system for a building which includes a pressure regulating valve (PRV) having a PRV inlet and a PRV outlet. The PRV can be normally operative in a best operating range mode and a in a lockup mode during time periods of no flow. An outlet pressure sensor is in fluid communication with the PRV outlet to measure the PRV outlet pressure. A processor is operatively coupled to the outlet pressure sensor. The processor runs a pressure monitoring process to detect changes in the PRV outlet pressure when the PRV is in the lockup mode to give indicia of a building leak condition. (See for example, FIG. 1A where it understood that any pressure (or temperature sensors) present, at the inlet and/or outlet are operatively coupled to a processor by any suitable wired or wireless connection. The processor running the pressure monitoring process can be disposed on, at, or near the PRV, or there can be any suitable wired or wireless connection (e.g., Internet, cellular, etc.) to a remote computer that runs the pressure monitoring process. FIG. 1B is a drawing showing the smart PRV according to the Application operatively coupled to a processor 191. Processor 191 is operatively coupled to memory 193.

By monitoring pressure over time by a pressure monitoring process running on any suitable processor, such as, for example, a relatively simple controller or process controller, the pressure monitoring process can look for certain patterns of changes in the pressure, particularly during times of no flow when the PRV is in the lockup mode. For example, if the lockup pressure is about 41 psi, and the pressure monitoring process records a relatively steep change (large slope) change in the outlet pressure from the previous no flow lock up condition, such a change is likely indicative of a water leak in the plumbing system of the building. Such a leak can be a leak in the pipes, a fixture leak, or an appliance leak. Thus, a new type of leak detection system and method based on monitoring pressure changes in the outlet pressure of a PRV at no flow (or constant very low flow) where the PRV is in the lock up condition, outside of the normal best operating range.

As a test, we simulated a relatively tiny leak of less than 10 mL/hour, and found that when the leak began, we could detect it at the PRV outlet by observing a detectable pressure change, for example, from about 41.1 psi to about 40.2 psi on the order of one second. Moreover, for the relatively fast leak onset over a second, there was also detected a recover curve on the order of 10 to 20 seconds which contains additional information about a leak, such as rate of onset of the leak. (See for example, FIG. 2)

Based on a known or measured relationship between inlet pressure and lockup pressure, there is additional information which can be determined from the lockup pressure, such as inferred changes in inlet pressure. However, by adding a second inlet pressure sensor, changes in lockup pressure can be more directly determined to be caused by changes in the inlet pressure, or a change on the outlet building side of the PRV.

Especially where both inlet and outlet pressure are monitored by the pressure monitoring process over time, there can also be information determined about any change in the PRV setpoint pressure, such as, for example as caused by valve aging. Moreover, by observation of changes of both inlet pressure and outlet pressure, there can be observations of the health of the PRV itself, such as for example a determination of PRV failure, such as can be caused by failure of internal parts including a drying out or stiffening of pliable valve or seating elements.

It was also realized that the same pressure monitoring smart PRV system and process can similarly measure either just the outlet pressure, or preferably both the inlet and outlet pressure of a PRV installed as a pilot PRV of a much larger pressure control valve. Here, while the actual pressure measurements are made as before at the PRV, it turns out that the same determinations can be made as to leak detection, setpoint drift, and the health of the larger pressure control valve which is being controlled by the pilot PRV, such as changes in the building plumbing system, condition and setpoint of the PRV, and condition of the larger pressure control valve.

Another problem is that some buildings may already have a leak when this leak detecting device is installed.

In this case, a solution is to add an isolation valve, downstream of the PRV (typically immediately downstream), to determine the true lockup pressure of the PRV by ensuring that there is no flow through the PRV. The isolation valve can be manual or automatic (e.g. motor controlled by any suitable processor based controller). A manual isolation valve can be used during an installation procedure to set the lockup pressure. An automatic isolation valve can briefly shut off flow through the PRV at times, such as, when no one in the building is using water. This automatic feature enables the processor to track any drift in lockup pressure, increasing the accuracy of the leak detection algorithm, and monitoring the health of the PRV, by updating the lockup pressure. An increase in lockup pressure can also indicate a stiffening of the rubber sealing disc or damage to the seat of the PRV (or, an ACV as described herein below, where controlled by a PRV.

Note that, a leak is not detected while the isolation valve is closed because as long as the isolation valve is closed, the valve will be in lockup. However, the isolation valve closed state does allow the system to intelligently update the lockup pressure of the valve, which can change over time. This update of the update the lockup pressure of the valve increases the sensitivity and accuracy of the system. After the lockup pressure is re-evaluated and the isolation valve is opened, the system and method can then return to detecting leaks by monitoring for pressures below the lockup pressure, but still above the setpoint of the PRV.

Figure 1A:
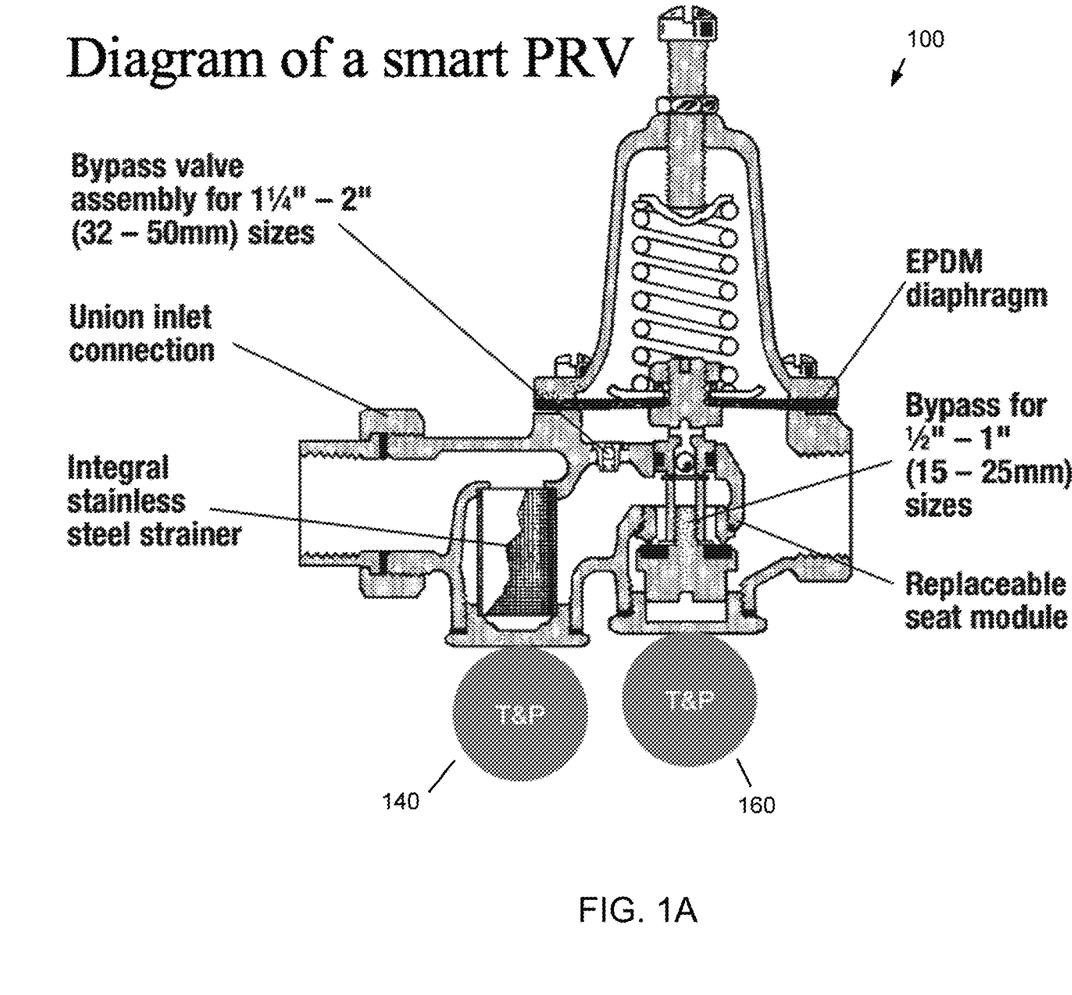
FIG. 1A is a drawing showing a smart PRV according to the Application.
Figure 1B:
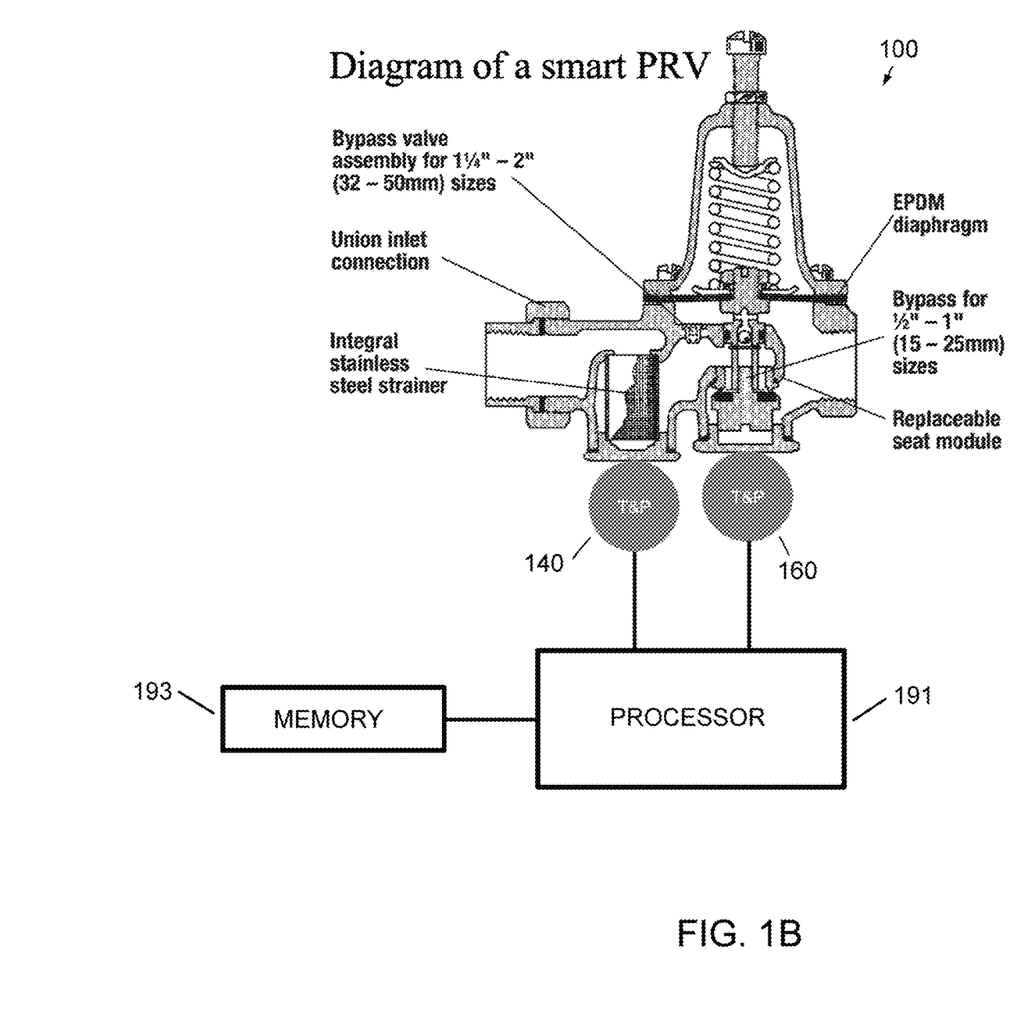
FIG. 1B is a drawing showing the smart PRV according to the Application operatively coupled to a processor.
Figure 5A:
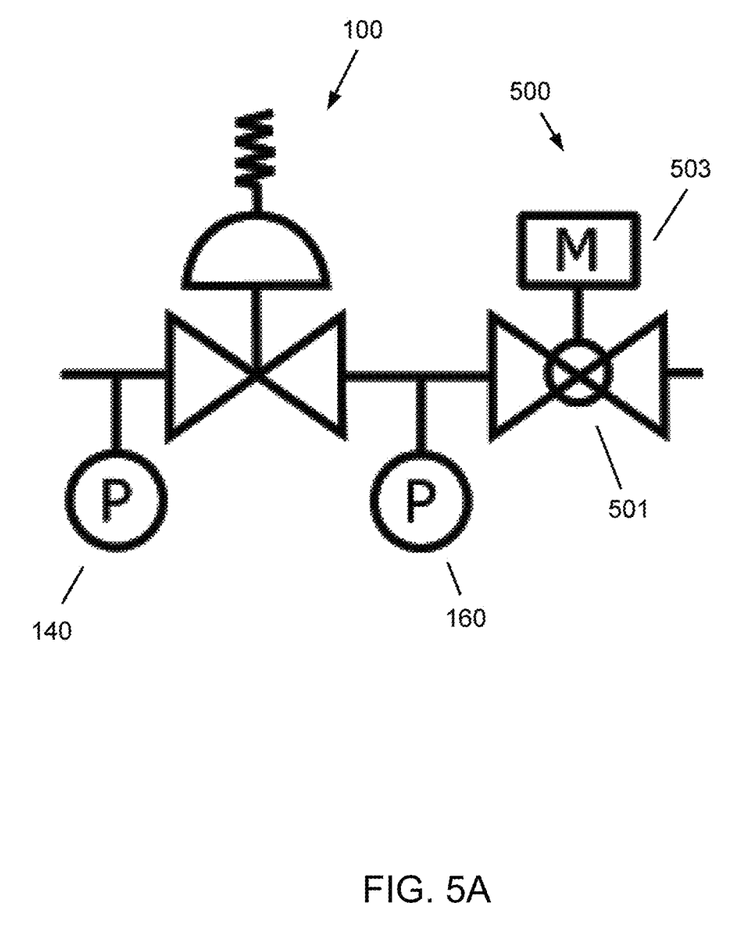
FIG. 5A is a drawing showing a piping and instrumentation diagram (P&ID) of the system according to the Application as shown in FIG. 1A with an additional isolation valve downstream of the PRV.

FIG. 5A is a drawing showing a piping and instrumentation diagram (P&ID) of the system according to the Application as shown in FIG. 1 with an additional isolation valve 500 downstream of the PRV 100. The isolation valve 500 downstream of the PRV can be used to force the PRV 100 to lockup.

Figure 5B:
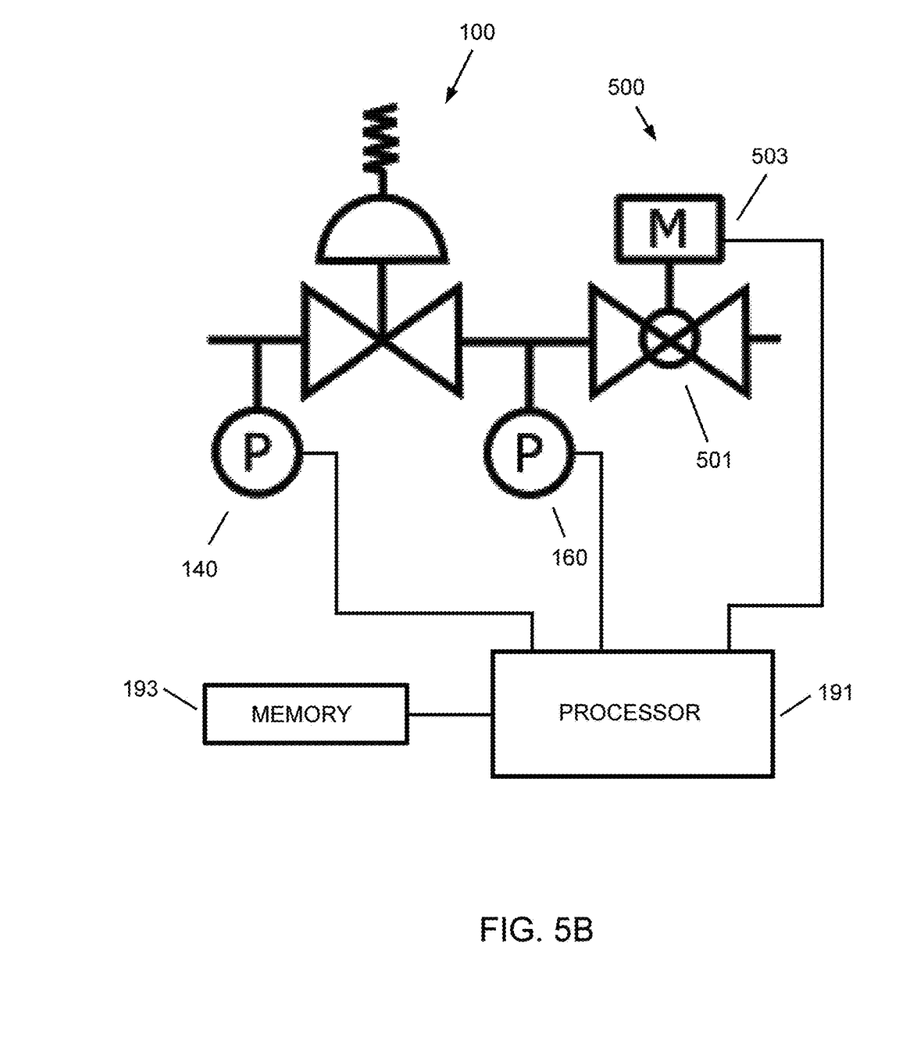
FIG. 5B is a drawing showing a piping and instrumentation diagram (P&ID) of the system according to the Application as shown in FIG. 5A where the isolation valve is controlled by a processor.

FIG. 5B is a drawing showing a piping and instrumentation diagram (P&ID) of the system according to the Application as shown in FIG. 5A where the isolation valve is controlled by a processor. As described hereinabove, valve 501 of the isolation valve 500 can be either a manual valve, or as shown in FIG. 5A include a motor 503 for automatic operation as controlled by a processor 191, such as a processor of a processor based controller.

The pressure monitoring process can consider, for example, magnitude of pressure changes, slope in time of pressure changes, and shapes of pressure change curves, including decay or oscillation curves.

Figure 2:
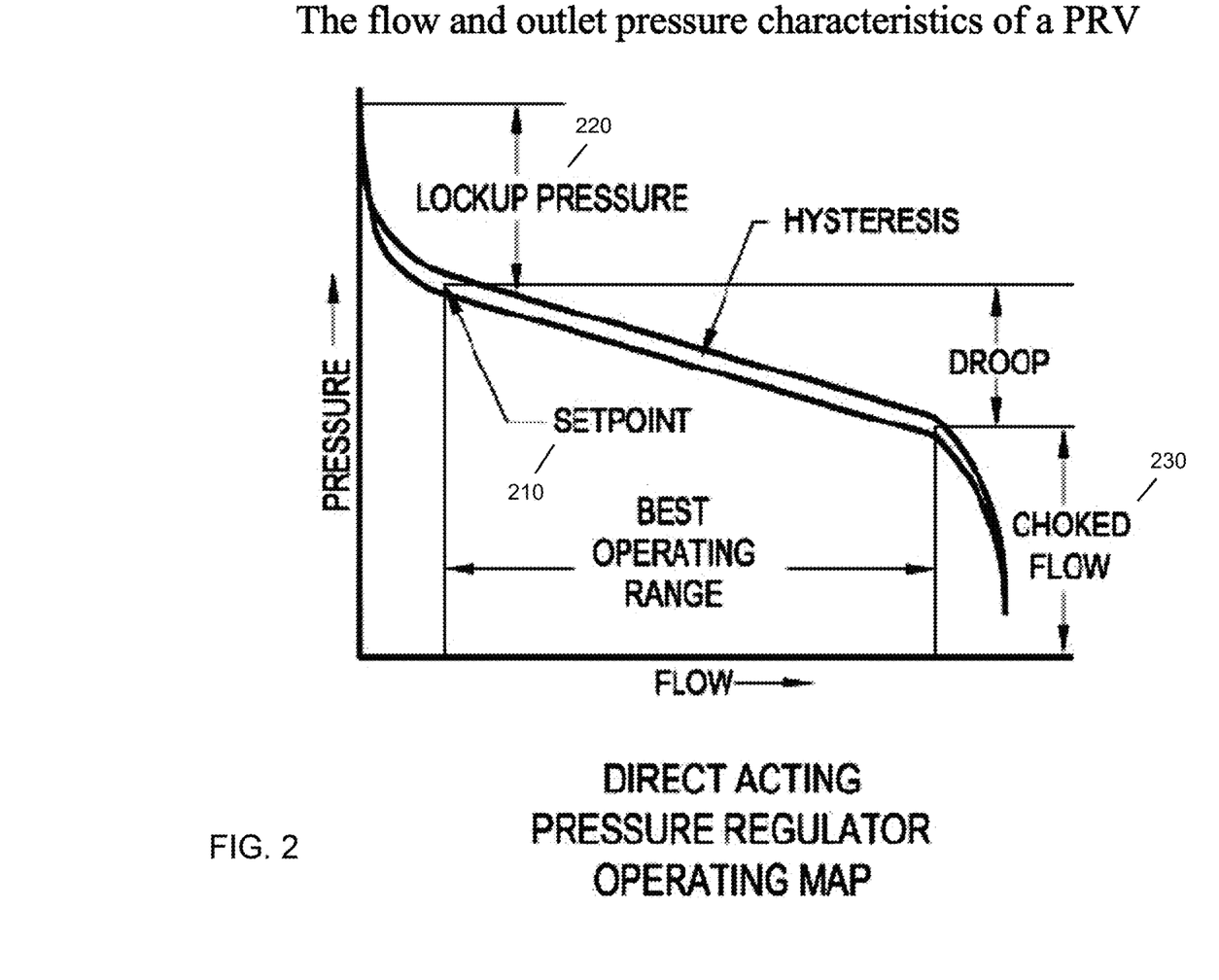
FIG. 2 is a graph showing pressure vs. flow for a direct action pressure regulator.
Figure 3:
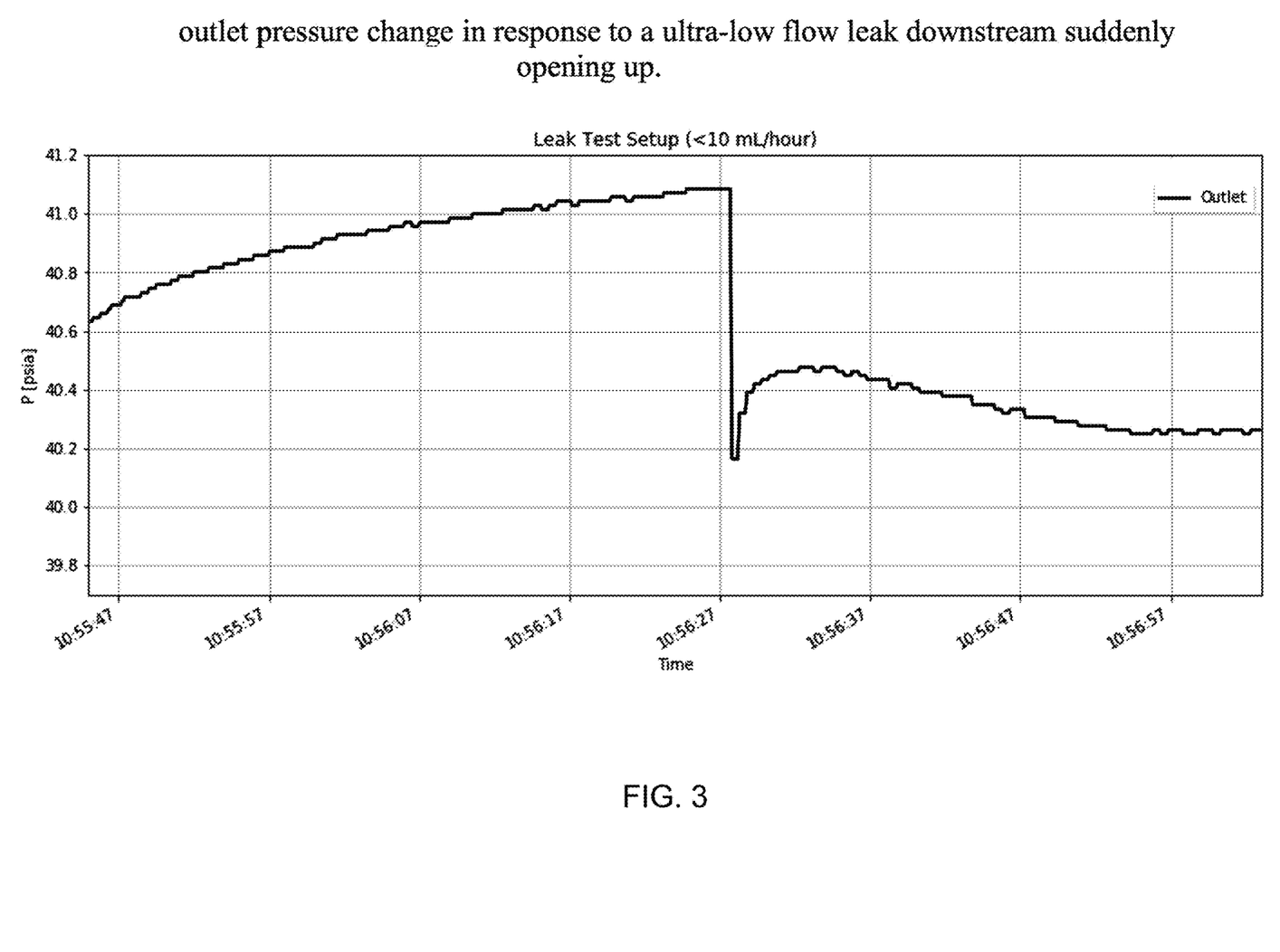
FIG. 3 is a graph showing the outlet pressure change in response to an ultra-low flow leak downstream suddenly opening up.

Example—FIG. 1 is a drawing showing a smart PRV according to the Application. T&P denote temperature and pressure sensors, the pressure sensors most relevant to this application. FIG. 2 is a graph showing pressure vs. flow for a direct action pressure regulator. FIG. 3 is a graph showing the outlet pressure change in response to an ultra-low flow leak downstream suddenly opening up.

Pressure regulating valve (PRV) 100 has two pressure sensors, inlet valve pressure sensor 140 connected to the valve inlet, and outlet valve pressure sensor 160 connected to the valve outlet as shown in FIG. 1. As shown in FIG. 2, the outlet valve pressure sensor 160 monitors the set pressure 210, lockup pressure 220, and falloff pressure 230 of the PRV 100. Because these phenomena are influenced by the inlet pressure, the inlet valve pressure sensor 140 can be used to monitor the upstream pressure. By using both sensors together, it is possible to separate the effect of upstream and downstream events on the valve outlet. By tracking the behavior of the valve over time, it is possible to separate out the effect of slow shifts in the mechanisms and materials from more sudden changes in downstream plumbing systems.

Flow can be estimated using a response surface generated in a lab or manufacturing facility. Because the response surface is very sensitive at low flows, due to the phenomenon of lockup, the new system and method of the Application is particularly effective at detecting leaks without the need for a flow sensor or an isolation valve to watch for pressure decay. That flow information can be used to provide insights to the building owner and operator about water usage and the health of their plumbing system. Drift in the performance of the PRV can be identified by tracking the lockup and setpoint pressures over time. If significant drift occurs, the smart valve system can notify the building owner of a valve malfunction that is exposing their plumbing system to excessively high pressures. Tracking drift also lets the valve monitoring algorithm separate slow changes in the operation of the valve from more sudden downstream leaks. The setpoint of the valve can be automatically determined during installation of the valve.

An Automatic Control Valve (ACV) is a regulator valve with fluid in the top of the valve instead of the spring in a PRV. Plumbing, or pilotry can be used to control the flow of fluid into and out of the top of the valve, actuating the membrane and orifice, thereby controlling the operation of the valve. When a PRV is the pilot for an ACV, the ACV regulates the outlet pressure to the set pressure of the PRV. By using the smart PRV described hereinabove, the ACV will have the same flow qualifying ability.

Figure 4:
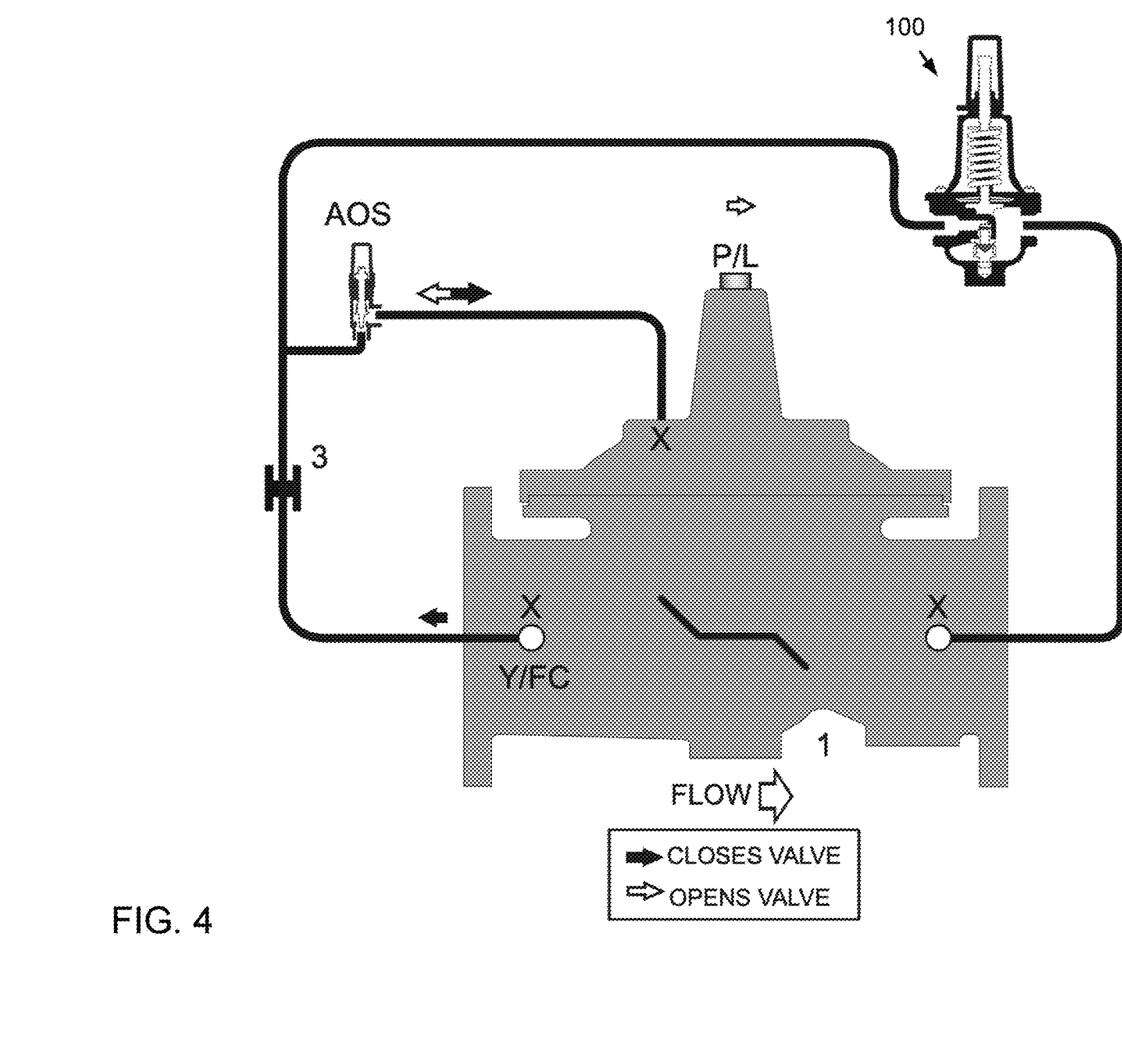
FIG. 4 is a drawing showing an exemplary ACV

Example—FIG. 4 is a drawing showing an exemplary ACV suitable for use as described hereinabove. The exemplary ACV is a S115 pressure reducing control valve available from the Watts Corporation of North Andover, Mass.

Processor—Any suitable processor can be used to run the pressure monitoring process. Suitable processors include controllers, programmable logic controllers, microcomputers, computers, computer servers, etc.

Software, programming code, firmware, etc. to implement a pressure monitoring process as described hereinabove can be provided on a computer readable non-transitory storage medium. A computer readable non-transitory storage medium as non-transitory data storage includes any data stored on any suitable media in a non-fleeting manner. Such data storage includes any suitable computer readable non-transitory storage medium, including, but not limited to hard drives, non-volatile RAM, SSD devices, CDs, DVDs, etc.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A leak detection system for a building comprising:
a pressure regulating valve (PRV) having a PRV inlet and a PRV outlet, said PRV operative during a flow of water through said PRV, and a PRV pressure at a lockup pressure during no water flow through said PRV;
an outlet pressure sensor fluidly coupled to said PRV outlet to measure a PRV outlet pressure; and
a processor operatively coupled to said outlet pressure sensor; said processor configured to run a pressure monitoring process to detect changes in pressure at said PRV outlet when said PRV pressure falls below said lockup pressure while remaining above a setpoint pressure to give an indicia of a building leak condition.

2. The leak detection system of claim 1, further comprising an inlet pressure sensor fluidly coupled to said PRV inlet, and operatively coupled to said processor.

3. The leak detection system of claim 2, wherein said pressure monitoring process to detect a drift of a PRV setpoint outlet pressure.

4. The leak detection system of claim 2, wherein said pressure monitoring process to detect a failure or onset of said failure of said PRV.

5. The leak detection system of claim 1, further comprising a pressure control valve controlled by said PRV, said PRV acting as a pilot PRV.

6. The leak detection system of claim 5, wherein said pressure monitoring process to detect a failure or onset of said failure of said pressure control valve.

7. The leak detection system of claim 1, further comprising an isolation valve fluidly coupled downstream of said PRV.

8. The leak detection system of claim 7, wherein said isolation valve comprises a manually controlled isolation valve.

9. The leak detection system of claim 7, wherein said isolation valve comprises an automatic controlled isolation valve operatively coupled to a processor to periodically close said isolation valve during times of water system no use or times of no occupancy of a home or building.

10. A method to give an indicia of a building leak condition comprising:
providing a pressure regulating valve (PRV) having a PRV inlet and a PRV outlet, said PRV operative during a flow of water through said PRV, and said PRV pressure at a lockup pressure during no water flow through said PRV, an outlet pressure sensor fluidly coupled to said PRV outlet to measure a PRV outlet pressure, a processor operatively coupled to said outlet pressure sensor said processor configured to run a pressure monitoring process; and
detecting changes in said PRV outlet pressure at said PRV outlet when said PRV pressure falls below said lockup pressure while remaining above a setpoint pressure to give an indicia of the building leak condition.

11. The method of claim 10, wherein said step of providing further includes providing said inlet sensor at said PRV inlet, and said step of detecting comprises detecting changes in said pressure at said PRV outlet and said PRV inlet when said PRV pressure falls below said lockup pressure while remaining above said setpoint pressure to give an indicia of said building leak condition.

12. The method of claim 10, wherein said step of providing further includes providing said isolation valve fluidly coupled downstream of said PRV, and before said step of detecting further comprises said step of stopping said flow of water through said PRV to determine a current lockup pressure.

13. The method of claim 12, wherein said step of stopping said flow of water comprises stopping said flow during a time of no home or building occupancy, to measure said lockup pressure.

14. The method of claim 12, wherein said step of stopping said flow of water comprises automatically closing said isolation valve by said processor during a time of no home or building occupancy.

* * * * *